Aug. 8, 1939.  G. H. OLSON ET AL  2,168,654
BRAKE OPERATING MECHANISM
Filed Jan. 13, 1938   3 Sheets-Sheet 1

Inventors
Gustaf H. Olson
Charles F. Schoene
Harold F. Allen
by Parker & Carter
Attorneys.

Aug. 8, 1939.   G. H. OLSON ET AL   2,168,654
BRAKE OPERATING MECHANISM
Filed Jan. 13, 1938   3 Sheets-Sheet 2

Inventors
Gustaf H. Olson
Charles F. Schoelm
Harold F. Allen
Attorneys

Aug. 8, 1939.　　　G. H. OLSON ET AL　　　2,168,654
BRAKE OPERATING MECHANISM
Filed Jan. 13, 1938　　　3 Sheets-Sheet 3
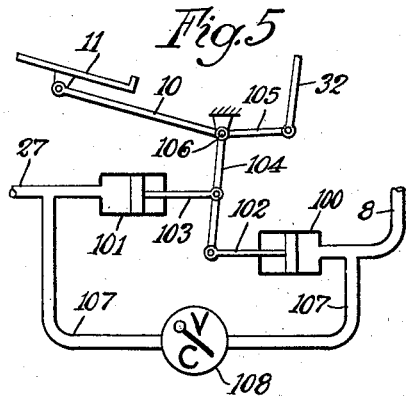
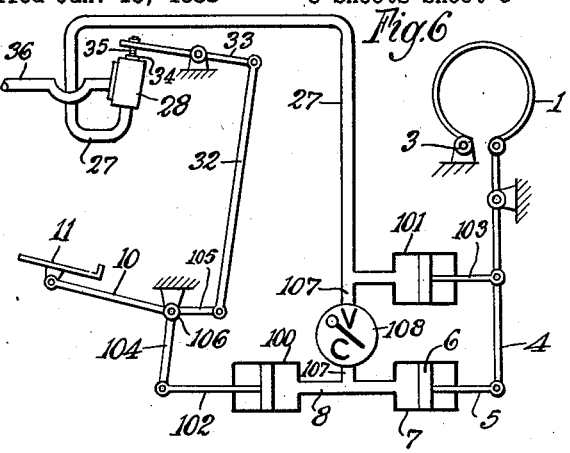
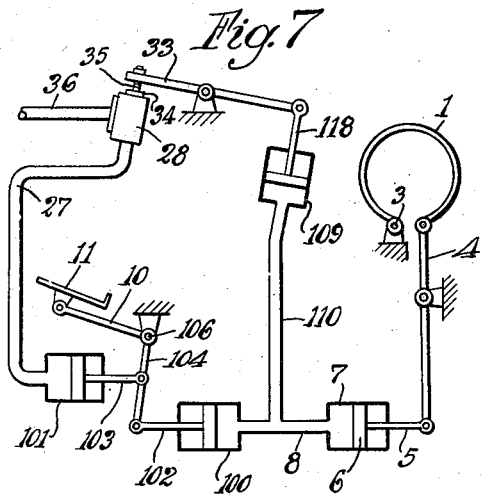
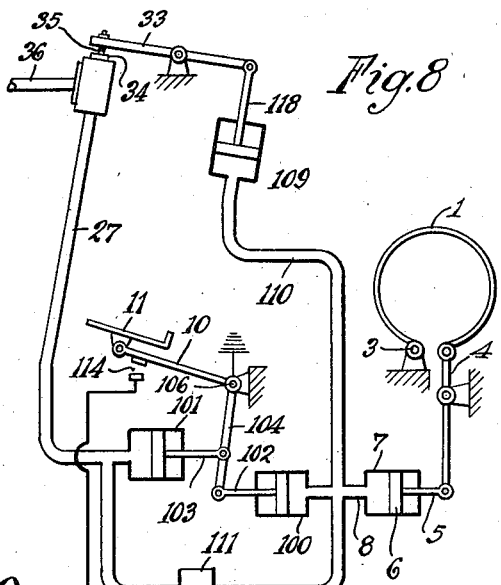
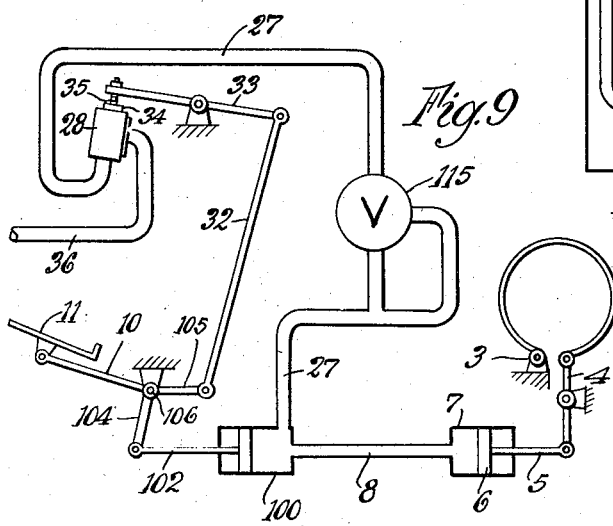
Inventors
Gustaf H. Olson
Charles F. Schoelm
Harold F. Aller
Attorneys Patented Aug. 8, 1939

2,168,654

UNITED STATES PATENT OFFICE 2,168,654

BRAKE OPERATING MECHANISM

Gustaf H. Olson, Charles F. Schoelm, and Harold F. Allen, Chicago, Ill., assignors to Link-Belt Company, Chicago, Ill., a corporation of Illinois Application January 13, 1938, Serial No. 184,776

11 Claims. (Cl. 188—151)

Our invention relates to operating mechanism for brakes and the like which are used in connection with the operation and control of excavators, hoisting machines and other apparatus.

An important element in all such devices is the brake which retards, stops or holds the load against falling or movement. For the purpose of illustration we have shown our invention in connection with a brake though it may be applied to clutches and the like, and while we have referred to our invention in terms of a brake or clutch, it is to be understood that the words "brake or clutch" are merely an illustrative description of a general type of device.

These brakes have to be manipulated a great many times during a day's work and when comparatively large power is being handled and large loads are lifted, the physical labor required of the operator is so great that it materially limits the power usable, the extent and amount of work which can be done and the speed of operation.

While many efforts have been made in the past to provide mechanical, hydraulic, pneumatic or electric means for operating a brake, they have not been entirely satisfactory because since mechanisms of the type in question must operate through a wide range, power, load and speed variations which cannot be predicated and vary not only between operations but during each operation, means while satisfactory for one operation or one part of a variation do not have the range of adjustability which is essential. We propose to combine with the foot or hand operated lever, means which will be automatically controlled in response to the operation of the lever by the operator to assist him in his work. By doing this, we are enabled to permit the operator to feel the work as it is by the sense of touch that the operator is enabled to develop his skill in manipulating the load. As a result, therefore, the operator handles the work just as he would if he were using his unaided strength but he has at his command additional means which operate automatically without conscious control on his part to assist him without in any way interfering with his feel of the work and his normal unaided manipulative faculties.

Our invention, therefore, involves automatic means, automatically responsive to and controlled by the operator for assisting him in his manipulation of the brake or clutch or other work which he is doing.

Our invention is illustrated more or less diagrammatically in the accompanying drawings, wherein—

Figures 4, 5, 6, 7, 8 and 9 are diagrammatic sketches of modified forms; and

Figure 10 is a further modified form.

Like parts are indicated by like symbols throughout the specification and drawings.

Figure 1:
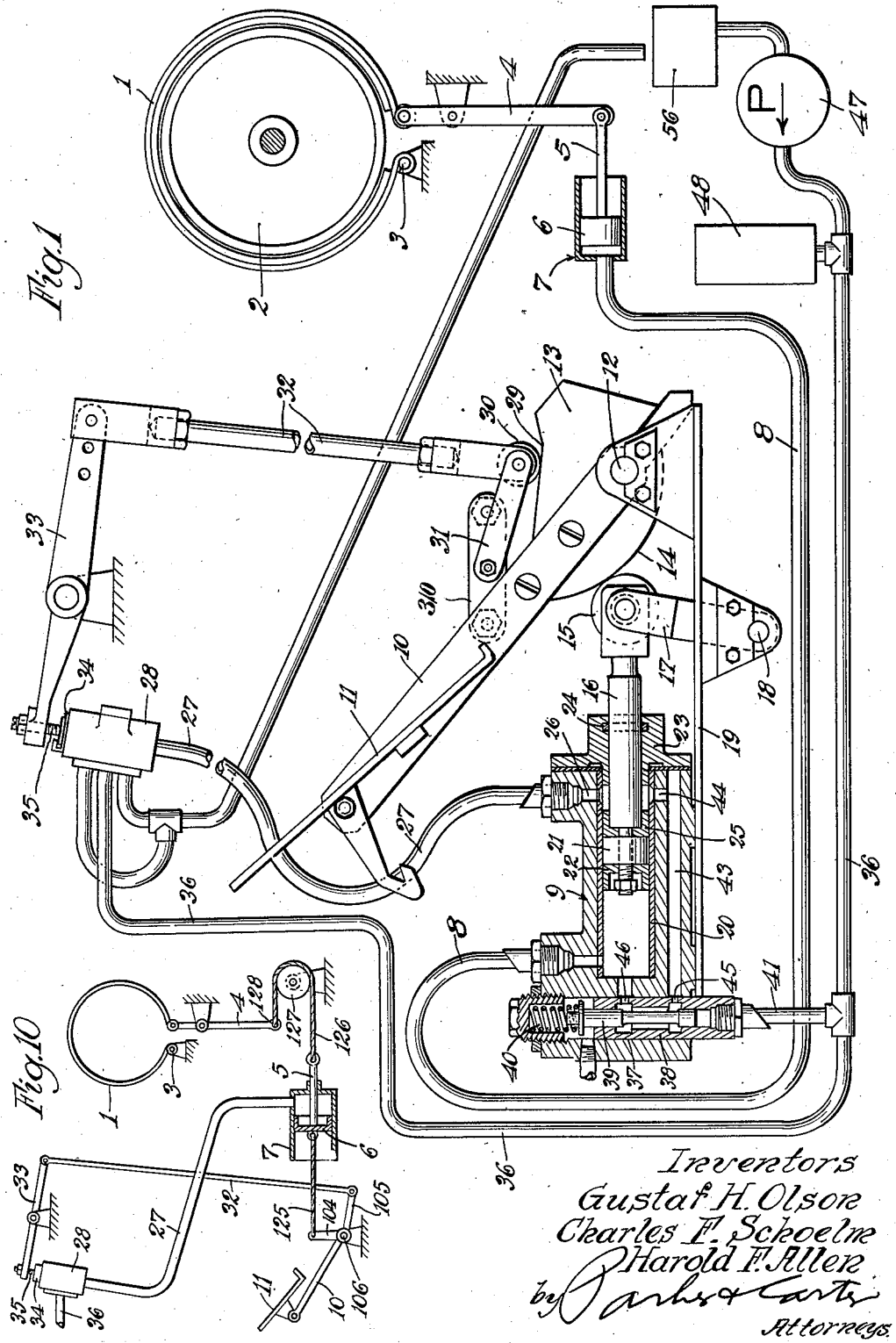
Figure 1 is a side elevation in part section of a brake band and operating mechanism of the preferred type.

1 is a brake band wrapped around a brake drum 2, anchored at one end on abutment 3 and supported at the other end on pivoted lever 4. 5 is a connecting rod between the free end of the lever 4 and the brake actuating piston 6 in the brake actuating cylinder 7. 8 is a hydraulic hose or pipe between the booster brake cylinder assembly 9 and the brake actuating cylinder 7. The brake band and lever are merely illustrative of any suitable mechanism which may be actuated by movement of the piston 6 responsive to the pressure of the hydraulic fluid supplied through the pipe 8, and the hydraulic connection itself is merely illustrative of any suitable hydraulic, pneumatic or mechanical connection.

10 is an operating lever which in this case has a pivoted foot pedal 11 and is itself pivoted on pin 12. The cam plate 13 has a curved cam surface 14 which engages a cam roller 15 on piston rod rocker arm 17 which is pivoted on a pin 18. The cross head associated with the piston rod 16 is apertured, the aperture being sufficiently loose to permit lost motion between them as the piston rod reciprocates and the rocker arm 17 rotates. This lost motion is not shown because it forms no part of the invention. Pins 12 and 18 and booster brake cylinder assembly 9 are all mounted on platform 19.

Booster brake cylinder assembly 9 contains a liner 20 within which the application piston 21 driven by piston rod 16 is mounted for reciprocation. The pipe 8 is connected to the cylinder in front of the piston 21 so that when the operator rotates the lever 10, the cam 14 engages the roller 15 to force the piston forwardly, leakage being prevented by the packing cup 22. The pressure in the cylinder 9 is transmitted through the pipe 8 to the cylinder 7 to rotate the lever 4 in a counterclockwise direction and apply the brake.

23 is a cylinder head, and 24 a seepage groove. 25 is a packing cup on the rear end of the piston 21, to enable it to serve as a booster piston. The annular space between the piston rod 16 and the liner 20 enclosed at one end by the cylinder head 23 and at the other end by the cup 25 is the booster cylinder. It is connected by passage 26 and 27 to the variable pressure valve housing 28.

29 is a booster cam on the cam plate 13. It is engaged by a roller 30, guided by a rocker arm 31 pivoted on a fixed abutment 310 and mounted on an adjustable reach rod 32. The rod 32 is pivoted to the rocker arm 33 at any one of a plurality of holes so that the lever through which the reach rod actuates the rocker arm may be adjusted.

34 is a variable pressure valve plunger or thimble, adjustably engaged by a screw 35 on the rocker arm 33 so that as the operator moves the lever 10 in counterclockwise direction, the cam 13 moves rocker arm 33 in counterclockwise direction to open the variable pressure valve and allow hydraulic fluid from the pipe 36 through the valve assembly 28 and pipe 27 to exert a pressure on the booster piston in the same direction as the pressure exerted by the operator so that the hydraulic pressure applied to the booster piston tends to assist the operator in moving the actuating piston 21 to apply pressure through the pipe 8 to the piston 6 to actuate the brake band.

At the closed end of the booster brake cylinder assembly 9 and extending transversely to the axis of the cylinder is an aperture 37 in which is socketed a valve seat 38. Slidably mounted in this valve seat is a valve plunger 39. 40 is a spring, the tension of which is adjustable, tending to push the plunger downwardly. This tension is resisted and the valve plunger is held in the open position as indicated in Figure 1 by pressure of the hydraulic fluid in the pipe 36 communicated to the valve seat through the pipe 41. If pressure in the pipe 36 should fall off, the spring 40 would be able to force the plunger valve 39 into the closed position.

43 is a passage in the wall of the booster brake cylinder assembly communicating at one end through the port 44 with the booster cylinder and at the other end through a port 45 with the interior of the valve seat. 46 is a port between the application cylinder and the interior of the valve seat 38 through which when the valve 39 is in the position shown there is a free and unobstructed passage or communication between the application cylinder and the booster cylinder, and also with the hydraulic system through the pipe 27 and variable pressure valve. 47 is a pump which supplies hydraulic fluid under pressure to the pipe 36, the accumulator 48 floating on the line tends to damp out local temporary variations in pressure resulting from the simultaneous or overlapping operation of various hydraulic mechanisms in the system and also tends to damp out any pressure variation resulting from pump operation.

The hydraulic system including the brake actuating cylinder 7, the application cylinder 20 and the pipe 8, communicate with the pressure system, when valve 39 is in open position as shown, keeping it always full, but when pressure in pressure system falls below a predetermined point, causing said valve 39 to close, the hydraulic system comprising brake actuating cylinder 7, application cylinder 20, and pipe 8, becomes a closed one and thus still remains operative, but without the aid of the booster system. The booster system on the other hand is not closed and provision is made for return to the low pressure side of the main hydraulic power system through the variable pressure valve, it being understood that when the variable pressure valve is closed, hydraulic liquid under pressure flows back through the pipe 27 and variable pressure valve to the return side of the pressure system.

From the above it will be understood that the operator has at all times a direct connection between his foot or his hand and the brake. When he moves the brake lever, the piston rod moves in, the piston moves forward and as long as the system is filled with hydraulic fluid, the pressure will build up and force the brake actuating cylinder out to rock the lever and tighten up the brake band. However, because of the connection between the cam which rotates with the lever and the variable pressure valve, the operator as he moves the lever to exert pressure, will at the sam time gradually open the variable pressure valve and allow hydraulic fluid to come in from the outside source of pressure to exert an additional forward pressure on the actuating piston to help build up hydraulic pressure in the brake system and help to apply the brake. As the operator increases the pressure applied by his foot or hand on the lever which he controls, he moves the lever forward and increases the pressure applied to and so the holding effect of the brake. This is characteristic of any operator propelled brake mechanism, and because of this fact he gets the "feel" of the work. It is highly desirable that the booster mechanism shall not interfere with this "feel" of the work and so the mechanism which we have shown has a booster mechanism responsive to the movement of the lever by the operator, and the operator thus gets the same kind of control and "feel" of the work with respect to the booster that he does with respect to the force he personally applies. This is accomplished by means of the cam which controls the booster reach rod and by means of the variable pressure valve because the further the operator moves the lever, the further he opens the variable pressure valve and the more pressure he admits to the booster end of the system. As the operator moves in the opposite direction, gradually releasing the pressure of his foot or hand, he at the same time gradually reduces the pressure admitted to the booster piston and so he gets the same feel of the work with respect to the booster as he does with respect to the pressure which he personally furnishes.

The combination in the single housing of actuating piston, booster piston and safety valve gives a compact design, reduces leakage and prevents misalignment but it also makes it possible to use the booster system to maintain an automatic make up in the hydraulic brake actuating system. When pressure is applied by the operator's lever and by the variable pressure valve, that pressure assists the operator in the booster operation and at the same time feeds into the brake operating system hydraulic fluid to maintain it at all times full.

The pressure of the hydraulic fluid in pipe 41 compresses the spring 40 and holds the valve 39 in such position that ports 45 and 46 are open leaving a passage for hydraulic fluid under pressure from the variable pressure valve 28 through pipe 27, port 44, passage 43, port 45, the valve seat 38 and port 46 to the brake hydraulic system, so that except for the pressure drop in the line, the pressure in pipe 8 and other parts of that closed system will be the same as the pressure of the hydraulic fluid discharged into the system by the variable pressure valve. If pressure falls in the main line 36, the spring 40 will force the valve 39 down to close the port 46. The application system will then be disconnected from the remainder of the system, hydraulic fluid will be unable to escape and the operator can control the brake by foot pressure alone.

By this arrangement, the pressure in front of piston 21 is balanced by the pressure behind piston 21 plus the pressure applied by the operator on the piston rod 16, so that there is available to push the piston 21 forwardly and operate the brake, not merely the pressure applied through the piston rod by the operator but also the additional pressure applied to the booster piston around the piston rod controlled by the variable pressure valve and as will hereinafter appear the further the lever 10 is depressed, the greater will be the pressure available to assist the operator.

In the variable pressure valve housing 28 is socketed a cylindrical valve seat 52; above the upper end of the valve seat is a drain passage 53 adapted to carry seepage away from the valve. 54 is a high pressure passage which communicates with the pump line 36. 55 is an exhaust passage which communicates with a low pressure return pipe which conducts the spent hydraulic fluid to a reservoir 56 whence it may be drawn by the pump 47 and returned to the high pressure system. The passage 53 is also connected to this low pressure line. 57 is a by-pass in the housing. 58 is a piston valve slidable in the valve seat 52. At its upper end is a flange member 59 forced yieldingly upward by a spring 60. 61 is the pressure control spring compressed between the flanged member 59 and the slidable thimble or plunger 34 which is provided with a packing 62. 63 is a stop limiting the upper excursion of the thimble.

Figure 2:
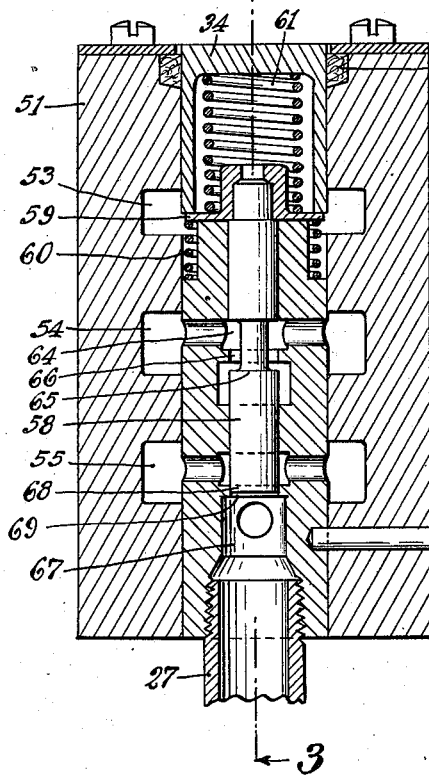
Figure 2 is a longitudinal section through the variable pressure valve.
Figure 3:
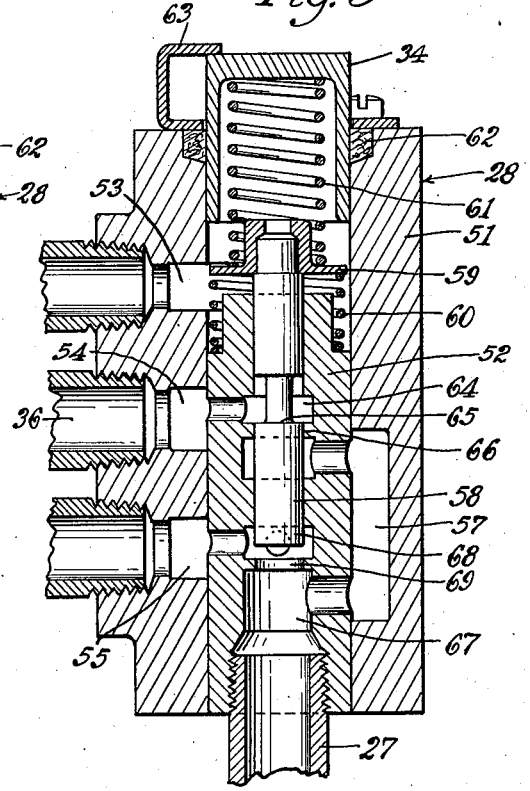
Figure 3 is a section with valve in different position taken on the line 3—3 of Figure 2.

In the position shown in Figure 3, no pressure is released by the variable pressure valve. In the position shown in Figure 2 maximum pressure is released by the variable pressure valve. In the position shown in Figure 3 hydraulic fluid under pressure is in the passage 54 and in the valve chamber 64 but cut off from the system because the cylindrical portion of the valve 65 closes the valve seat 66. If the thimble or plunger 34 is pushed downwardly, the pressure on the spring 61 will be built up and the valve plunger will move down opening valve seat or port 66 and allowing hydraulic fluid to flow through the passage 57 into the chamber 67 and into the pipe 27. The parts are so arranged that just before the port 66 is opened, the lower end 68 of the valve 58 will close the port 69 to close the exhaust.

With the valve in the position shown in Figure 2, maximum pressure is released, but in any intermediate position of the valve, it will remain open until the pressure in the chamber 67 is sufficient to overcome the compression of the spring 61. For instance, if we assume that the cross sectional area of the end of the piston 58 is one-fourth of an inch and if we load the spring 61 to 100 pounds, the valve will stay open until a pressure of four times a hundred pounds or four hundred pounds per square inch is built up in the chamber 67, the pipe 27 and the associated hydraulic system. Between minimum and maximum pressure, the variable pressure is controlled by the valve because if the spring 61 is loaded to less than maximum, since there is at the start no pressure in the chamber 67, the valve will immediately open. As soon as pressure has been built up to a point in the chamber 67 sufficient to overcome the pressure of the spring 61, the valve will be forced back to close port 66, but since this is a hydraulic system and the hydraulic liquid is substantially uncompressible, the instant that happens the valve will be in balanced position between the spring and the pressure with no exhaust and no further pressure coming in from the outside. If the pressure is further increased on the spring 61 the valve opens again until pressure is balanced and soon up to the maximum pressure available in the system.

Immediately upon release of the pressure in whole or in part on the spring 61, pressure in the chamber 67 forces the valve back far enough to cause 68 to clear the port 69 and permit exhaust of the liquid, until the pressure decreases enough to permit the spring 61 to again close the exhaust. The variable pressure control is available both as pressure builds up and as pressure goes down and there is a pressure in the system directly responsive to every position between maximum and minimum of the thimble 34.

In general, our invention therefore discloses first a lever or similar element which is intended to be manipulated by the operator either by hand or by foot for the purpose of applying the brake or clutch or moving whatever mechanism is to be manipulated or controlled. This member is connected by means of what we have called for convenience a brake operating system, to the brake or other element which is to be manipulated. Preferably it is a hydraulic brake operating system. Associated with it is a hydraulic pressure system which may provide a booster effect to assist the operator in applying pressure or manipulating the brake and may also provide make-up means whereby the hydraulic system remains always filled with a supply of hydraulic liquid.

While we have shown in detail what is at present the proposed form of our invention, the invention can be carried out in a number of different combinations and by a number of different types of mechanism, and these are diagrammatically illustrated in Figures 4 to 8, wherein for purposes of convenience and economy, some of the elements shown in Figures 1 to 3 have been omitted, and wherein the same reference character has been applied to similar elements in all the figures, Figures 1 to 3 as well as the diagrammatic Figures 4 to 8.

Figure 4:
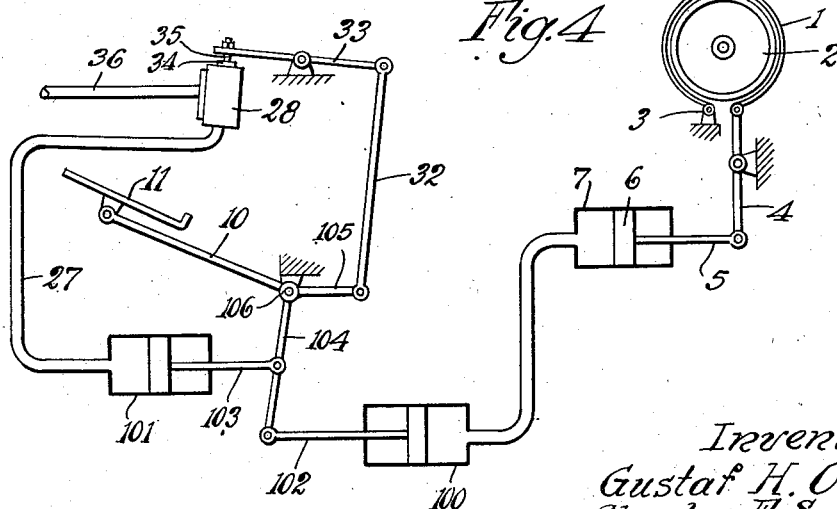

Figure 4 illustrates a modification wherein the hydraulic connection between the booster cylinder and application cylinder is eliminated, and shows the brake band 1 actuated by the piston 6 through link 5 and lever 4, the cylinder 7 receiving hydraulic pressure through the pipe 8 just as in Figure 1. However, in this arrangement the application cylinder 100 and the booster cylinder 101 are entirely separate, being connected by means of links 102, 103 respectively, with the lever 104, which lever is actuated by the operator's lever 10 just as in Figure 1. Substituted for the cam 13 is a lever 105. The remainder of the mechanism is the same as in the preferred form. The booster effect may be controlled by changing the distance between pivot point 106 and the points on the lever 104 at which the booster and application cylinder are connected to the lever, or by varying the respective diameters of the cylinders 100 or 101 or both, and the relative proportions of the lever arms of the cylinders is a matter of design. This is perhaps the simplest form of the invention. It has no check valves, no connection between the main pressure system and the brake actuating pressure system.

Figure 5 shows a modification wherein a bypass 107, between pipe 8 associated with the actuating cylinder 100 and pipe 27 associated with the booster cylinder 101, is used. This insures that the pressure must be the same in cylinders 100 and 101, and a check valve 108 protects the brake actuating system against loss of pressure, if there should be a failure of pressure in the pressure supply line. In other words, the pressure in the pipe 8 and cylinder 100 will always be as high as the maximum pressure developed in the pipe 27 by the variable pressure valve, but when that pressure drops off, the pressure remains in the actuating system and no loss occurs.

In Figure 6 the booster cylinder is applied directly to the brake actuating lever. Aside from that, the arrangement is the same in principle. The by-pass 107 between cylinders 6 and 101 with the check valve 108 is also disclosed. It will be understood, however, that the by-pass alone without the check valve, or the by-pass and check valve both, might, if desired, be eliminated, and it will further be understood that a safety valve responsive to pressure in the main line, as illustrated in Figure 1, or to pressure in the line between the valve block and cylinder 101, might be substituted for the check valve diagrammatically shown at 108.

In the drawings above referred to, we have illustrated the use of simple lever and link mechanisms and cam and roller mechanisms. These are of course merely illustrative of a wide range of suitable type of connecting or power transmitting mechanisms which might be used without departing from the spirit of our invention.

A further modification is shown in Figure 7 wherein the variable pressure valve is actuated by utilizing the hydraulic pressure built up in the application cylinder as distinguished from a direct mechanical connection between the operator's lever and the variable pressure valve. This is illustrated in Figure 7 wherein the mechanism is generally the same as that of Figure 4 except that the lever 33, instead of being connected as indicated in Figure 4 by lever and link, is provided at one end with a link 118 actuated by the piston in the cylinder 109 which receives hydraulic pressure through a pipe 110 from the pipe 8 so that when the operator rotates his lever to build up a pressure in the brake system, the variable pressure valve is actuated not by the direct mechanical connection, but in response to the pressure built up by the operator. This same mechanism for the control of the variable pressure valve might equally well be applied to the device of Figures 1, 5 and 6.

Figure 8 shows a further modified form wherein the variable pressure valve is pressure actuated just as in Figure 7, and a safety valve 111 is placed in the line. This safety valve is actuated to open a by-pass when operating lever 10 is moved to a predetermined point, in order to provide make-up oil in the brake actuating system. As shown, the safety valve is operated by a solenoid 112 actuated by current from a battery 113, the circuit being closed by a switch 114 mounted on the operator lever, though of course the safety valve might be directly mechanically operated by the lever 10 if desired.

The various devices above discussed make it possible to apply to manually operated hydraulic brakes for such heavy equipment as large shovels, cranes, drag lines, hoists and the like, where the large diameters of the brakes with their necessary working clearances, the elasticity of various parts, slack in connections and heavy loads, necessitate either considerable volume displacements or very high liquid pressures, a mechanism which can be manually controlled and wherein outside means are available to assist the operator. All of the foregoing illustrations show means for applying a booster mechanism to reduce the manual effort required without sacrificing the essential feel of the work which must be present if the operator is to be able to manipulate the mechanism with accuracy and speed.

Figure 9 illustrates an apparatus which provides means for supplying liquid from a pressure system to take up brake band clearances, slack and the like, thereby making possible final application and control of the brake through the displacement of a relatively small volume of liquid, by effort of the operator, from a master cylinder. In this mechanism, there is interposed in the pipe 27 leading from the variable pressure valve 28 to the hydraulic system comprising the application cylinder 100 and the brake actuating cylinder 6, a pressure regulated shut-off valve 115, which may be set to close the line at a predetermined pressure. When the lever 10 is moved down slightly, the valve 28 is open permitting the liquid to flow through the pipe 27, shut-off valve 115, to the actuating cylinder 100, thus taking up the clearance and slack in the brake until the pressure reaches the point at which the valve 115 closes. Further pressure by the operator on the lever 10 increases the liquid pressure in the closed system between the valve 115, cylinder 6, thus setting the brake an amount determined by the operator. Release of pressure on the lever 10 reduces the pressure in the system, causing the valve 115 to open at the same time as the variable pressure valve takes a position to permit liquid to flow from the closed system back to release the brake.

These various devices have this in common, that in every instance there is a manually operated lever which may be operated by foot or hand, of course, and that lever exerts a pressure in the system to apply the brake. Associated with this is an outside hydraulic pressure system wherein fluid under pressure is stored automatically, available in response to the movement of the operator control element to enter the system and to assist the operator in the application of the brake, either directly or indirectly.

There are a large number of possible combinations of this arrangement. For instance, we have shown a booster and application cylinder in one, though they might be separate. We have shown a cam and a lever interchangeably used to transmit the force of the operator to the work. There is a variable pressure valve which may be mechanically or hydraulically controlled in response to the movement by the operator of the working lever. The main brake operating system may or may not be separate from the pump system. If they are connected, a by-pass may be used between the actuating and the booster cylinder and it may or may not have a check valve, a safety valve, or automatic release valve. The booster effect may be applied to the lever rotated by the operator, may be applied to the piston operated by the operator, or to the brake lever itself. Any of these various combinations and many others that will be instantly obvious, fall within the purview of our invention.

Where in the claims we have referred to a brake, it is understood that by brake we mean any mechanism, brake, clutch or anything of the like, which is moved or actuated or manipulated in response to the movement of the lever which may be manual, that is, hand operated, or operated by the foot of the driver, or by any other means directly responsive to, under control of, and flexibly resisting the force of the operator so as to give him the essential feel of the work.

In the modified form shown in Figure 10, the general arrangement of parts is the same except that instead of the hydraulic connection between the lever 10 and the lever 4, a cable 125 extends from the lever 104 to the piston 6, and a cable 126 extends from the end of the piston rod 5 around a sheave 127 and is anchored at 128 on the free end of the lever 4. The control of the variable pressure valve is the same as shown for instance in Figure 6 and the booster cylinder is merely interposed between the two ends of the mechanical system so that the operator applies mechanical pressure by means of the cables as indicated, to the brake but this mechanical pressure is assisted by the booster cylinder. Under these circumstances, of course, there is no provision for make-up and none of the hydraulic controls needed to provide for such connection are present but the characteristic of manual power plus booster with the operator able to "feel" the work is present in this exemplification also.

We claim:

1. A control mechanism for brakes and the like comprising a manually operated lever and a brake, a hydraulic brake system interposed between them adapted to transmit power from the lever to the brake, a hydraulic pressure system associated with the hydraulic brake system, means responsive to movement of the lever for supplying hydraulic fluid from the pressure system to assist the operator in moving the lever, means for admitting hydraulic fluid from the pressure system to the brake system, and automatic means for closing the connection between the pressure system and the brake system when the pressure in the pressure system falls beyond a predetermined point.

2. A control mechanism for brakes and the like comprising a manually operated lever and a brake, a hydraulic brake system interposed between them adapted to transmit power from the lever to the brake, a hydraulic pressure system associated with the hydraulic brake system, and a variable pressure valve operated in response to movement of the lever for supplying hydraulic fluid from the pressure system at pressure varying in response to the movement of the lever to assist the operator in moving the lever, and means for admitting hydraulic fluid from the pressure system to the brake system, and automatic means for closing the connection between the pressure system and the brake system when the pressure in the pressure system falls beyond a predetermined point.

3. A control mechanism for brakes and the like comprising an application cylinder, a piston therein, a manually operated lever, a driving connection between it and the piston, a cylinder head for one end of the cylinder through which the piston rod extends, a brake actuating cylinder, a hydraulic connection between it and one end of the application cylinder, a hydraulic connection between the two ends of the application cylinder, a spring loaded valve adapted to close this connection, a hydraulic pressure system, a member actuated by pressure in the hydraulic system to overcome the spring pressure and maintain the valve open when the hydraulic pressure exceeds a predetermined point.

4. A control mechanism for brakes and the like comprising an application cylinder, a piston therein, a manually operated lever, a driving connection between it and the piston, a cylinder head for one end of the cylinder through which the piston rod extends, a brake actuating cylinder, a hydraulic connection between it and one end of the application cylinder, a hydraulic connection between the two ends of the application cylinder, a spring loaded valve adapted to close this connection, a hydraulic pressure system, a member actuated by pressure in the hydraulic system to overcome the spring pressure and maintain the valve open when the hydraulic pressure exceeds a predetermined point, and a separate connection between the hydraulic pressure system and the other end of the application cylinder.

5. A control mechanism for brakes and the like comprising an application cylinder, a piston therein, a manually operated lever, a driving connection between it and the piston, a cylinder head for one end of the cylinder through which the piston rod extends, a brake actuating cylinder, a hydraulic connection between it and one end of the application cylinder, a hydraulic connection between the two ends of the application cylinder, a spring loaded valve adapted to close this connection, a hydraulic pressure system, a member actuated by pressure in the hydraulic system to overcome the spring pressure and maintain the valve open when the hydraulic pressure exceeds a predetermined point, a variable pressure valve, a connection between it and the hydraulic pressure system on one side and between it and the other end of the application cylinder on the other side.

6. A control mechanism for brakes and the like comprising an application cylinder, a piston therein, a manually operated lever, a driving connection between it and the piston, a cylinder head for one end of the cylinder through which the piston rod extends, a brake actuating cylinder, a hydraulic connection between it and one end of the application cylinder, a hydraulic connection between the two ends of the application cylinder, a spring loaded valve adapted to close this connection, a hydraulic pressure system, a member actuated by pressure in the hydraulic system to overcome the spring pressure and maintain the valve open when the hydraulic pressure exceeds a predetermined point, a variable pressure valve, a connection between it and the hydraulic pressure system on one side and between it and the other end of the application cylinder on the other side, and a mechanical connection between the manually operated lever and the variable pressure valve adapted to gradually open the valve and increase the pressure delivered thereby as the lever forces the piston into the application cylinder.

7. A control mechanism for brakes and the like comprising a housing including an application cylinder, a piston therein, a manually operated lever, a driving connection between it and the piston, a cylinder head for one end of the cylinder through which the piston rod extends, a brake actuating cylinder, a hydraulic connection between it and one end of the application cylinder, a hydraulic connection between the two ends of the application cylinder, comprising a conduit in the housing, a spring loaded valve contained within the housing, one end of the conduit communicating with the valve and a passage interposed between the valve and the other end of the cylinder, all contained within the housing, the spring loaded valve being adapted to close the conduit joining the two ends of the cylinder, a hydraulic pressure system, a member actuated by pressure in the hydraulic system to overcome the spring pressure and maintain the valve open when the hydraulic pressure exceeds a predetermined point.

8. A control mechanism for brakes and the like comprising an application cylinder, a piston therein, a manually operated lever, a driving connection between it and the piston, a cylinder head for one end of the cylinder through which the piston rod extends, a brake actuating cylinder, a hydraulic connection between it and one end of the application cylinder, a hydraulic connection between the two ends of the application cylinder, a spring loaded valve adapted to close this connection, a hydraulic pressure system, a member actuated by pressure in the hydraulic system to overcome the spring pressure and maintain the valve open when the hydraulic pressure exceeds a predetermined point, a variable pressure valve, a connection between it and the hydraulic pressure system on one side and between it and the other end of the application cylinder on the other side, and a mechanical connection between the manually operated lever and the variable pressure valve adapted to gradually open the valve and increase the pressure delivered thereby as the lever forces the piston into the application cylinder, the mechanical connection comprising a pivoted lever in adjustable engagement with the variable pressure valve at one end, a link adjustably pivoted at the other end of the lever, a cam carried by the manually operated lever and adapted to engage and reciprocate the end of the lever.

9. In a housing, a cylinder open at one end, a closure therefor, a piston within the cylinder, a piston rod therefor extending through the closure, a valve seat in the housing, conduits in the housing leading from both ends of the cylinder to the valve seat, a spring loaded valve in the seat adapted to close the conduits, a piston associated with the valve, and means for supplying hydraulic fluid thereto to overcome the spring pressure and open the valve, and separate hydraulic connections for both ends of the cylinder.

10. In combination, a manually operated lever, a cylinder, a piston, a piston rod, a variable pressure valve, a connection between it and the cylinder, a reach rod adapted to control the variable pressure valve, cam means on the lever for actuating the piston and the reach rod and rocker arms each pivoted at one end on a stationary support and the other end respectively on the piston rod and the reach rod to position them.

11. In combination, a hydraulic pressure system, an application cylinder and piston, a brake actuating cylinder and piston, a hydraulic connection between the two cylinders, a variable pressure valve controlling the supply of hydraulic fluid from the hydraulic pressure system, a connection between the valve and the end of the application cylinder removed from the connection between it and the brake actuating cylinder, a connection between the two ends of the application cylinder, a spring loaded valve adapted to close the connection, a connection between the hydraulic pressure system and the spring loaded valve adapted to overcome the spring and open the valve responsive to pressure in the high pressure system, the variable pressure valve being adapted in consonance with movement of the application piston to increase the pressure on the side of the piston furthest removed from the connection to the brake actuating cylinder and also while the spring loaded valve is open to supply hydraulic fluid at pressure controlled by the variable pressure valve to the system including the application and brake actuating cylinders.

GUSTAF H. OLSON.
CHARLES F. SCHOELM.
HAROLD F. ALLEN.